G. W. DUCHEMIN.
MACHINE FOR MAKING AIRPLANE PROPELLERS, &c.
APPLICATION FILED OCT. 10, 1918.

1,363,238.

Patented Dec. 28, 1920.
5 SHEETS—SHEET 1.

INVENTOR:
George W. Duchemin,
BY
Russell M. Everett,
ATTORNEY.

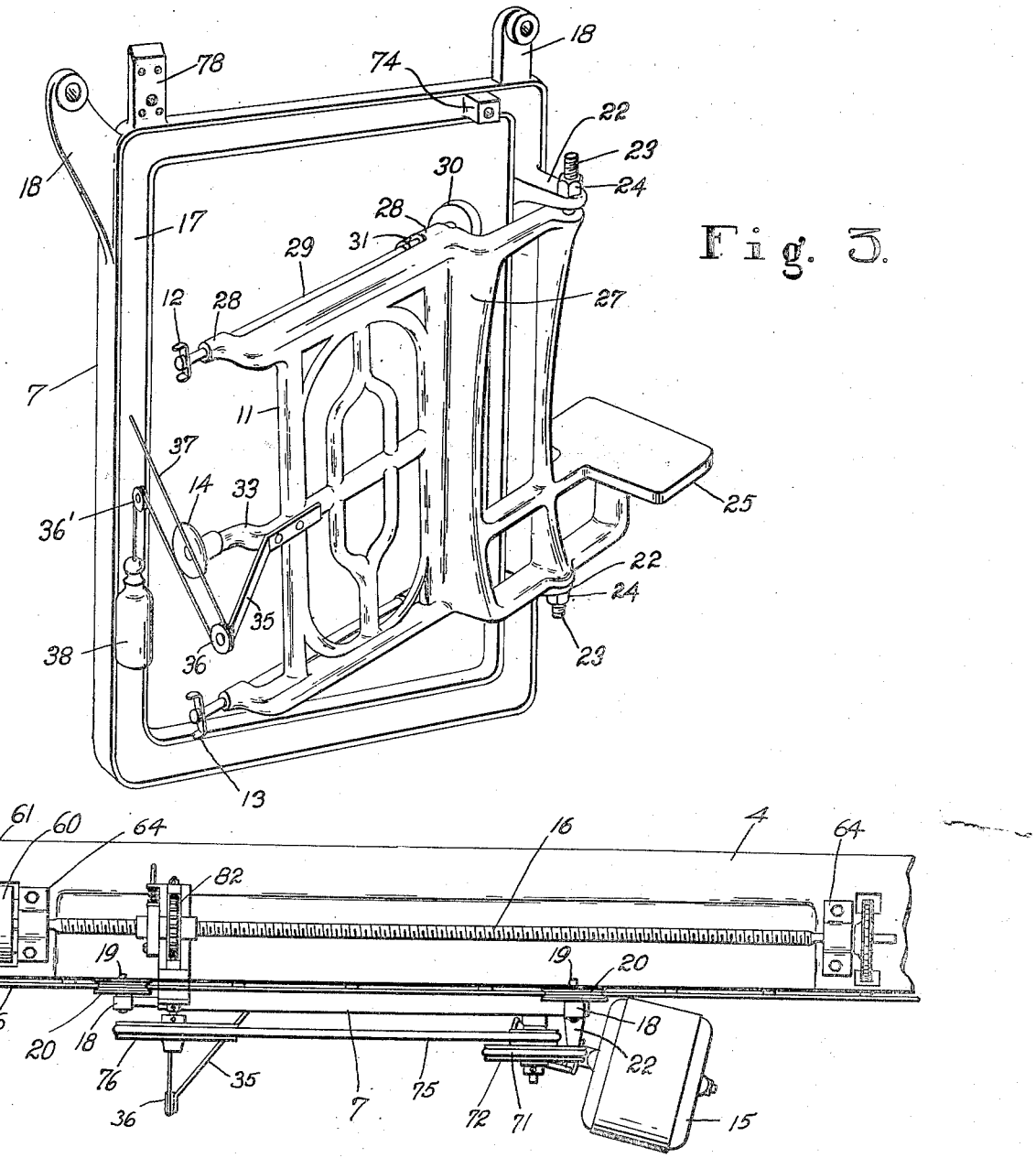

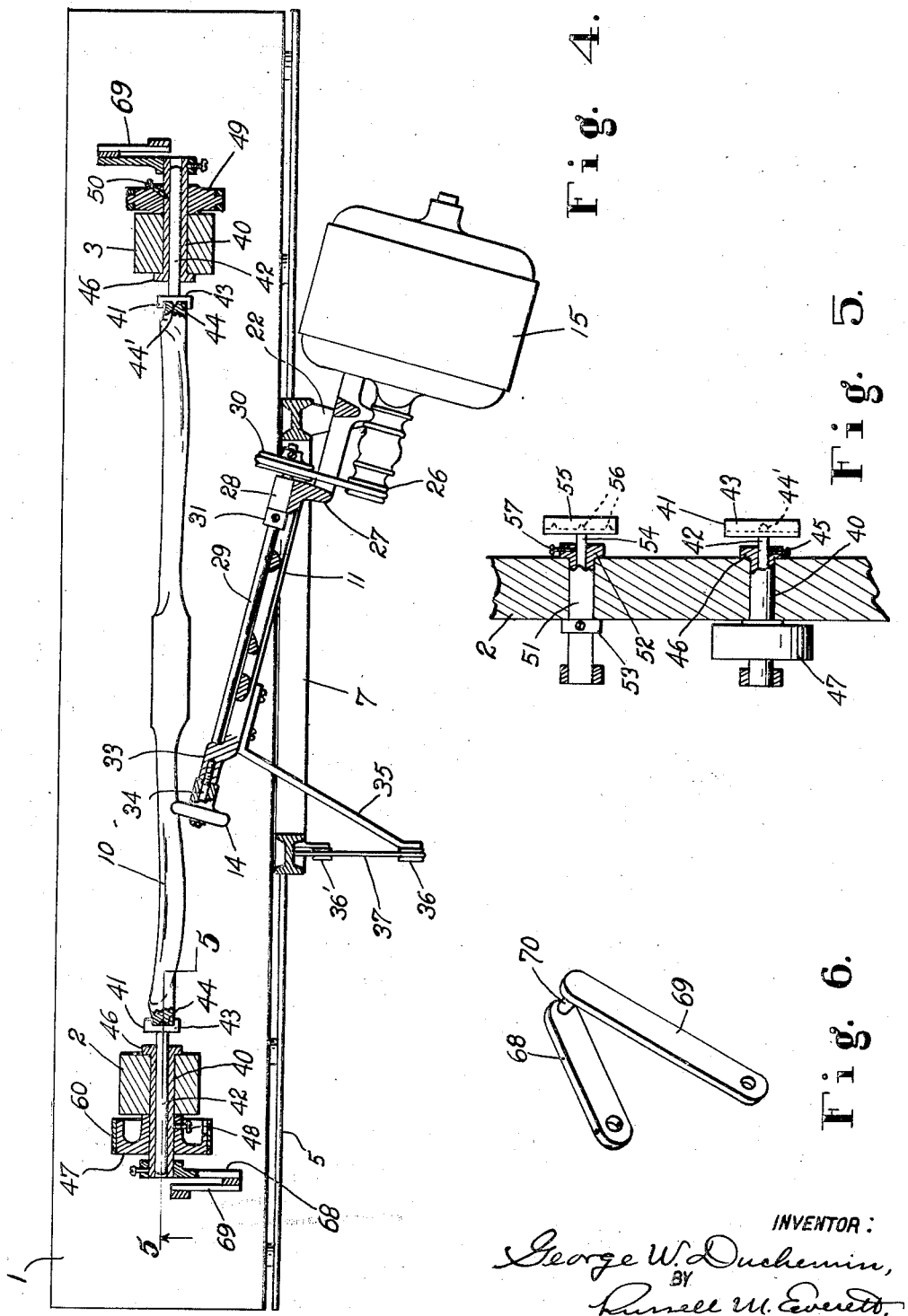

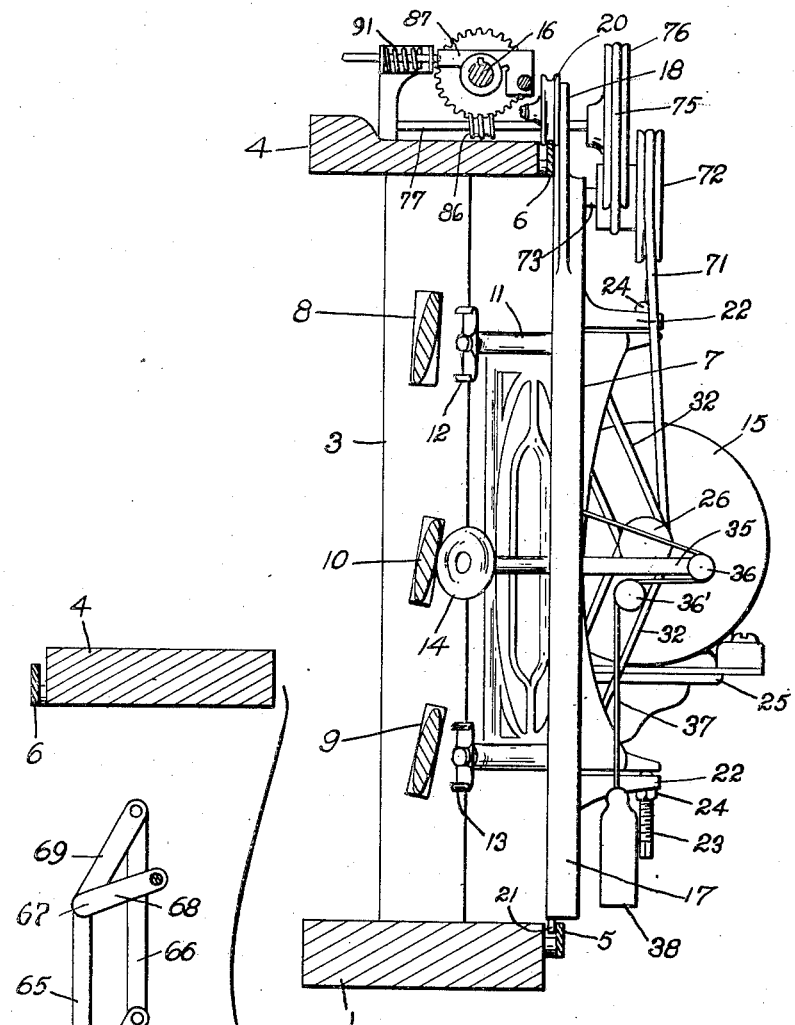

G. W. DUCHEMIN.
MACHINE FOR MAKING AIRPLANE PROPELLERS, &c.
APPLICATION FILED OCT. 10, 1918.

1,363,238.

Patented Dec. 28, 1920.
5 SHEETS—SHEET 5.

INVENTOR:
George W. Duchemin,
BY
Russell M. Everett,
ATTORNEY.

UNITED STATES PATENT OFFICE.

GEORGE W. DUCHEMIN, OF NEWARK, NEW JERSEY.

MACHINE FOR MAKING AIRPLANE-PROPELLERS, &c.

1,363,238.                    Specification of Letters Patent.    Patented Dec. 28, 1920.

Application filed October 10, 1918.   Serial No. 257,554.

*To all whom it may concern:*

Be it known that I, GEORGE W. DUCHEMIN, a subject of Great Britain, and a resident of Newark, in the county of Essex and State of New Jersey, have invented new and useful Improvements in Machines for Making Airplane-Propellers, &c., of which the following is a specification.

This invention relates more especially to machines for shaping or turning the propellers into their proper form or contour, but while designed more particularly for airplane propellers it obviously could be employed for similar purposes such as making oars or any other articles which present the same difficulties that are overcome by the present invention.

The objects of the invention are to facilitate and expedite the manufacture of airplane propellers by enabling a plurality of them to be shaped or turned at the same time in a single machine; to enable the shaping or turning of all the propellers to be controlled by a single guide wheel traveling upon one pattern or model; to enable both sides of the propeller to be shaped in the same operation; to secure a regular and even feeding of the work through the machine; to secure a steady movement of the cutters around the sharp edges of the work; and avoid vibration or irregularity at those points; to secure a simple construction which can be readily built and is not liable to get out of order, and to obtain other advantages and results as may be brought out in the following description.

Referring to the accompanying drawings, in which like numerals of reference indicate the same parts throughout the several views, Figure 1 is a side elevation of the machine from its front;

Fig. 2 is a plan of the same, showing its top;

Fig. 3 is a perspective view of the carriage removed from the machine, with the swinging frame still in it but without the motor and power transmitting means;

Fig. 4 is a horizontal longitudinal section on line 4—4, Fig. 1;

Fig. 5 is a section of the pattern and the work-holding means at the left-hand end of Fig. 4, but on a plane at right angles to the plane of that section, or vertical, as indicated by line 5—5;

Fig. 6 is a perspective view of one of the crank arms employed in the connecting drive means at the ends of the pattern and the work-holding means;

Fig. 7 is a view of a portion of the right-hand end of the machine as shown in Fig. 1;

Fig. 8 is a vertical section at the other end of the machine, on line 8—8, Fig. 1, looking in the direction indicated by the arrow;

Fig. 9 is a vertical cross-section of the machine on line 9—9, Fig. 1;

Figure 1:
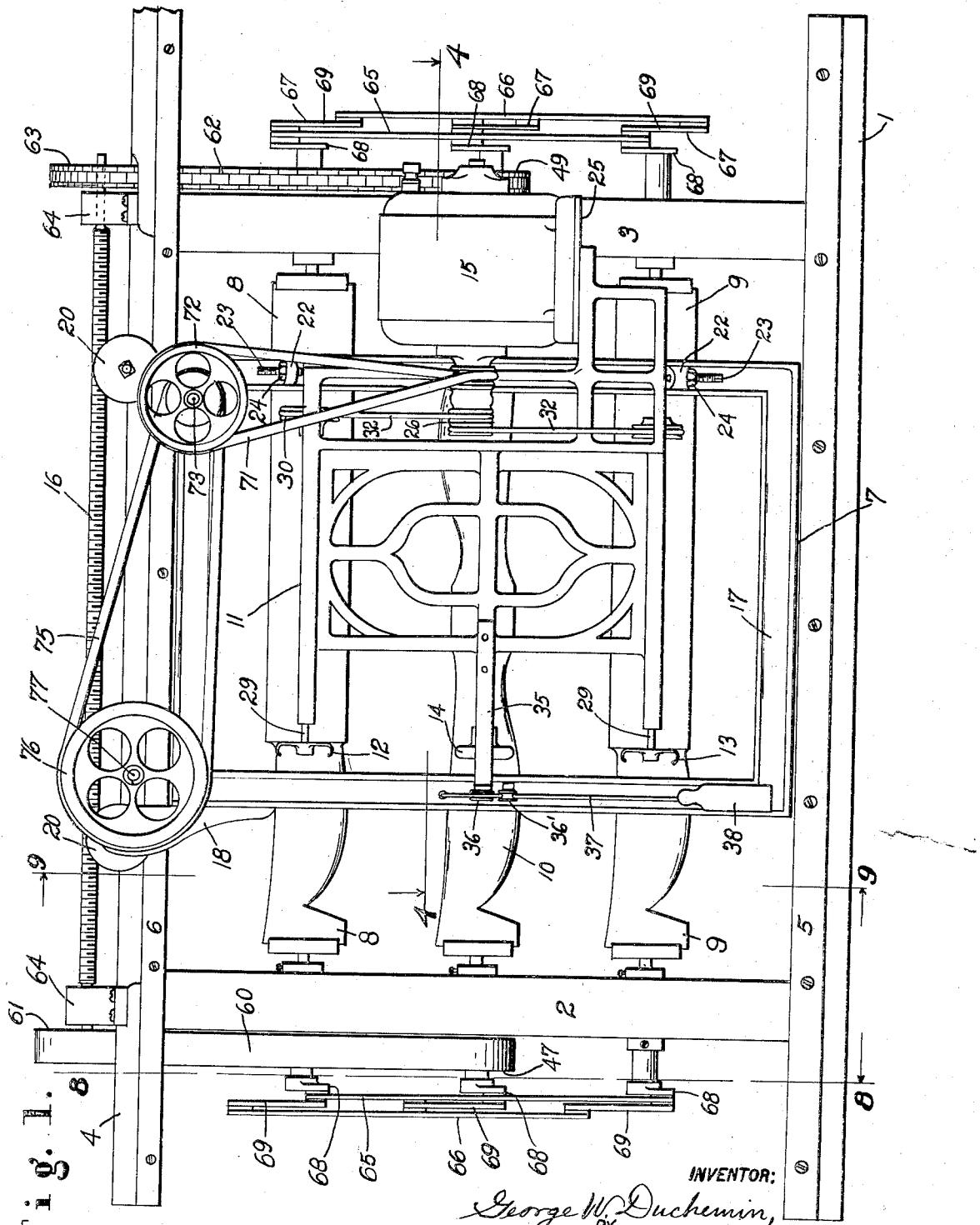

In the specific embodiment of the invention shown in said drawings, 1 indicates the base piece of the body of my machine having spaced uprights 2, 3 fixed thereon and connected at their upper ends by a top piece 4 which is parallel to the base piece 1, the whole forming a frame in which the working parts of my machine are mounted. Said base piece 1 and top piece 4 provide at their front edges tracks 5, 6, respectively, upon which a carriage 7 is adapted to travel longitudinally of the machine. The blanks 8, 9 for the propellers or other articles to be turned are rotatably mounted between the uprights 2, 3, one near the top and the other near the bottom, and the pattern or model 10 is similarly mounted between said blanks, it being understood that while I have shown one blank above the pattern or model and one below the machine could be built large enough to take a greater number of blanks above or below the central pattern or model. A swinging frame 11 is mounted in the carriage 7 to swing upon one upright side thereof and this swinging frame carries the cutters 12, 13 for the blanks 8, 9 and guide wheel 14 for the pattern or model 10, and also carries a motor 15 at its opposite end or end outside the carriage 7 from which motor the various parts of the machine are driven as will be hereinafter more fully described. The swinging frame 11 projects inwardly through the carriage 7 to engage the pattern and work, and the carriage itself travels longitudinally of the machine, by means of a screw 16 above the top piece 6, so as to feed said cutters and guide wheel along the length of the work.

Figure 10:
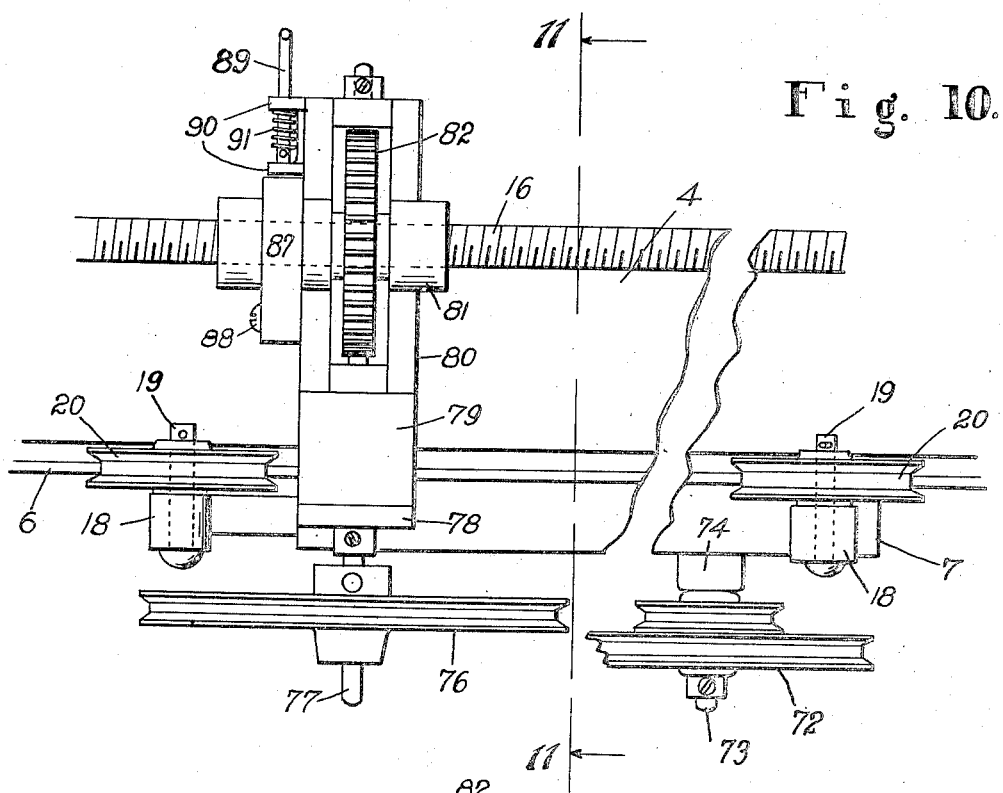
Fig. 10 is a plan of a portion of the machine, to show the feed mechanism.

Describing the parts of my improved machine in greater detail, the carriage 7 comprises a rigid rectangular frame 17, see Figs. 1, 3 and 9, which has at its top extensions 18, 18 adapted to receive at their upper ends pins or stub shafts 19, 19, see Fig. 10, upon which are mounted grooved wheels 20, 20 adapted to run upon the track 6 of the top piece 4. In this way, the carriage is supported so as to move freely and easily, and at its lower end it is guided by projections 21, 21 lying between the lower track 5 and the base piece 1.

The frame 17 of said carriage 7 has on one of its upright sides, the right-hand one as shown in Fig. 1, laterally projecting ears 22 toward the front of the machine, and between said ears is pivoted the swinging frame 11, preferably by pivot screws 23 threaded in said ears and provided with lock nuts 24. The swinging frame itself is of any openwork construction which will give it rigidity and stiffness, and has at its outer end or at the right hand side of its line of pivoting, as viewed in Fig. 1, a shelf 25 to which the motor 15 can be bolted in any suitable manner so that its shaft will project as nearly as possible through the line of pivoting of the frame and be substantially parallel to the frame. Said shaft projects far enough past the line of pivoting to carry driving pulleys 26 for the cutter shafts, and still farther beyond them, toward the left hand end of the swinging frame, said frame has a rearward offset 27, as shown in Figs. 3 and 4, which enables that end of the frame to lie farther into the opening of the carriage and thus nearer the work. The upper and lower edges of this offset portion of the swinging frame each provides at its rearward face bearings 28, 28 for a horizontal cutter shaft 29 which projects beyond the end of the swinging frame toward the work to receive a cutter 12 and also projects beyond the offset 27 of the swinging frame to receive a driving pulley 30, the driving pulley 30 being fixed on the shaft 29 at one side of the journal bearing 28. A collar 31 fixed on the shaft at the other side of said journal bearing prevents longitudinal movement of the shaft.

From the upper and lower pulleys 30, 30 belts 32, 32 extend to the pulleys 26, 26 on the motor shaft, and thus the cutters are driven in any manner suitable for the work. Said cutters may be of any ordinary and well-known type, those shown being only for illustrative purposes.

At the middle of the free end of the swinging frame 11 next the work, an arm 33 projects horizontally into the same plane as the top and bottom bearings 28, 28 and carries the guide wheel 14 pivoted thereto in any suitable manner, as by a screw 34 extending into the arm 33, see Fig. 4. In order to yieldingly swing the pivoted frame 11 inward and press the guide wheel 14 against the pattern or model and the cutters 12 against the work, I have shown a bracket 35 extending outwardly or forwardly from the swinging frame, preferably from the arm just described, and carrying at its end an idle pulley 36' over which extends a cord 37 fast at one end to the carriage 7 and being returned from the pulley 36 around an idle pulley 37 on said carriage to receive below the same a weight 38. Gravity acting upon the weight 38 will thus always tend to hold the cutters to their work and at the same time will enable the swinging frame to swing outward as desired for the guide wheel to follow the contour of the pattern or model.

It will be understood that the pattern or model and the pieces of work are mounted horizontally between the uprights 2, 3 and the details of the means for doing this is shown more particularly in Figs. 4 and 5, where 40, 40 indicate sleeves rotatably mounted in the uprights 2, 3 and receiving chucks 41, 41 to engage the opposite ends of the pattern, each of said chucks having a stem 42 to slide in its sleeve and thus enable the chucks to be adjusted to patterns of different length. The chucks have transverse heads 43 at their inner ends channeled as at 44 to receive the ends of the pattern, a centering projection 44' being preferably provided at the middle of the channel to enter the end of the pattern and hold it from movement longitudinally of the channel. When the chucks are fitted to the ends of the pattern, they are clamped with respect to the sleeves 40 by means of set screws 45 at the ends of the sleeve which project inwardly beyond the uprights 2, 3. Preferably these inwardly projecting ends have each a flange 46 which coöperates with the driving pulley upon the sleeve at the opposite side of the upright to hold said sleeve against longitudinal movement, said pulley being clamped upon the sleeve by a set screw or the like. For better illustration I have shown at the left-hand end of the machine, as viewed in Figs. 1 and 4, a belt pulley 47 with a set screw 48, and at the other end a sprocket wheel 49 with a set screw 50, but it will be understood that the same driving means could be employed at both ends if desired.

The means for holding the ends of the work one of which is shown in Fig. 5, are similar to the pattern-holding means just described, having each a sleeve 51 fixed in the upright by a flange 52 at one side of the upright and a collar 53 at the other side, said sleeve receiving the stem 54 of the chuck which has a channeled head 55 to receive the end of the work, with spurs 56 in the bottom of the channel to better engage the work. The chucks are adjustable toward and away from each other and adapted to be held after adjustment each by a set screw 57 radially disposed in the flange 52. I have shown in the drawings a pattern or model 10 and two pieces of work 8, 9, all rotatably held by the means above described for the purpose.

For rotating the pattern or model 10 and work pieces 8, 9 I have shown a belt 60 extending from the belt pulley 47 on the sleeve 40 for the pattern-holding chuck at the left-hand end of the machine to a driving belt pulley 61 on the end of the screw shaft 16 above the top piece 4 of the machine, and a chain 62 similarly extending from the sprocket wheel 49 at the other end of the machine to a driving sprocket wheel 63 on the other end of the screw shaft 16. This screw shaft 16 is journaled in bearings 64, 64 on the top piece 4 and is driven from the motor 15 by means hereinafter described to cause the carriage to travel along the tracks parallel to the work as has been already stated.

In order to transmit motion from the rotatable pattern or model holding and rotating means to the upper and lower work-holding means, I have shown pairs of connecting links, one pair at each end of the machine, so as to insure steady and even turning of the work pieces at all points of their angular motion. It will be understood that it is very difficult to carry the cutters around the sharp edges of the propeller blades with a steady continuous motion, such as will give a regular uniform cut, and therefor it is necessary to employ some such means as the pairs of connecting links shown. At the same time I do not wish to be restricted to the use of these links, as any other means which could be employed for the same purpose might be used if desired.

Each pair of connecting links, referring more especially to Figs. 1, 6, 7 and 8, comprises a pair of parallel links 65, 66 pivoted to angular cranks 67 fast on the outer projecting ends of the pattern and work-pivoting sleeves, said cranks at one end of the machine all projecting in the same direction and those at the other end projecting in just the opposite direction or arranged 180° away from the opposite cranks in angular position, to insure greater steadiness and evenness of motion. Each crank comprises an inner arm 68 and an outer arm 69 at such an angle to each other as to render it impossible for the opposite ends of the outer arm to ever be over the dead center at the same time; and then the links are pivoted to these opposite ends of the outer arm, as will be understood, the two arms of any one crank being rigidly connected by a rounded bar 70, see Fig. 6, to pivotally receive the link 65, while the other link 66 is pivoted to the opposite side of the outer arms as clearly shown in Fig. 1.

Coming now to the description of the driving means for the carriage, the shaft of the motor 15 carries a driving pulley at or near the line of pivoting of the swinging frame 11 over which a belt 71 runs to a double pulley 72 on a stub shaft 73 projecting forwardly from a boss 74 at the top of the carriage and near its right-hand end, see Figs. 1, 3 and 10. From said double pulley 72 another belt 75 extends along the top of the carriage to a pulley 76 fast on a shaft 77 having its bearings in a projection 78, and the parts carried thereby, at the top of the carriage and near its left-hand end. It is this shaft 77 which transmits motion to the screw shaft 16 to drive the carriage, as will next be described, and means are also provided for release from said screw shaft, when desired, to permit the carriage to be slid independent of the screw shaft or to stand still independent of movement of the screw shaft, shaft 77 and driving means back to the motor which have just been described.

Figure 11:
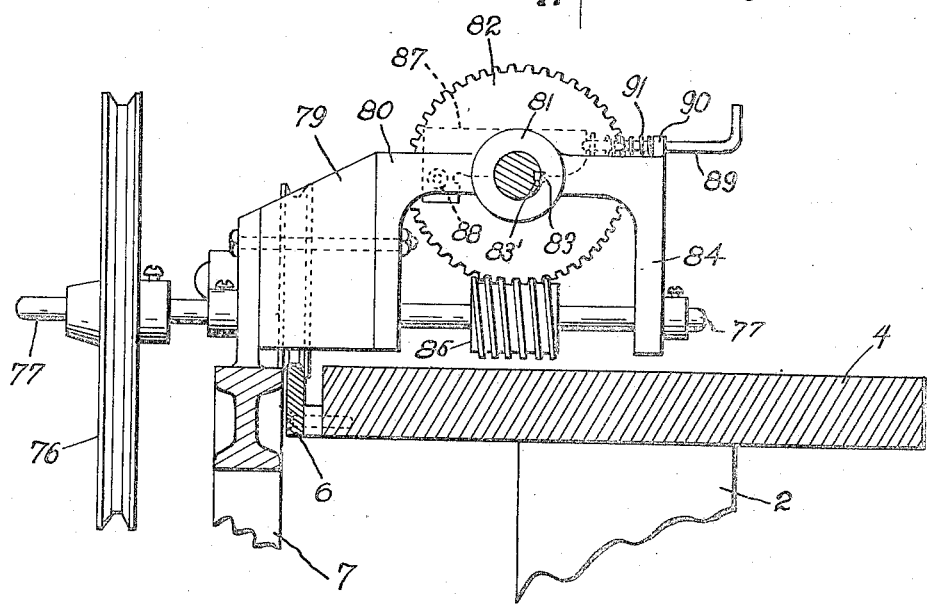
Fig. 11 is a sectional view of the same, on line 11—11, Fig. 10.

Referring more especially to Figs. 10 and 11, the projection 78 upon the top of the carriage, through which the shaft 77 passes, is extended rearward a little distance above the track 6 and top piece 4 from the machine, said extension being shown herein as a solid block 79, although it might be accomplished in any suitable manner. At the rear side of said extension 79 is secured a carrier 80 which provides at its top a transverse cylindrical portion 81 which is bored to slidably receive the screw shaft 16. The carrier is furthermore apertured vertically to receive a worm gear 82 which is also bored centrally to slidably receive the screw shaft 16 and has a key 83, as shown in Fig. 11, to slide in a keyway 83' in the screw shaft, so that said screw shaft and worm gear always turn together. The carrier 80 has a depending leg 84 which affords a bearing for the rear end of the shaft 77, and fast on said shaft 77, beneath the carrier 80, is a worm 85 meshing with the worm gear 82. It will be clear that the means thus described turn the screw shaft 16, and I will next describe how such motion is imparted to the carriage 7 when desired.

Referring to Figs. 10 and 11 and the upper part of Fig. 9, the upper half of a part of the cylindrical portion 81, at one side of the carrier 80, is cut away to expose the screw shaft 16, and a half-nut 87 is provided to close down onto the screw shaft at this point, said half-nut being pivoted to the side of the carrier 80, as at 88. Thus when it is desired for the carriage 7 of the machine to move, this half-nut 87 is closed down onto the screw shaft, so that as the shaft turns without longitudinal motion the half-nut and carrier must be moved along the shaft; on the other hand, when it is desired to have either the screw shaft or the carriage moved independent of the other, the half-nut 87 is tipped or swung up out of engagement with the screw shaft. Preferably some suitable means is provided for locking the half-nut in engaging position, such as the bolt 89 which I have shown sliding in arms 90 on the side of the carrier 80 and normally forced by a spring 91 into locking engagement with the half-nut. Any other suitable means might be employed, however.

Various other modifications and changes may be made in manufacturing my invention without departing from the spirit and scope of the invention, and I do not wish to be understood as restricting myself except as required by the following claims when construed in the light of the prior art.

Having thus described the invention, what I claim is.

1. In a machine of the character described, the combination of a body having means for supporting and rotating a pattern and a work piece, a carriage substantially parallel to said body, a swinging frame mounted upon and extending transversely across a marginal portion of said carriage and having an offset portion adapted to lie in an opening of the carriage or swing out of the plane thereof, counter-balancing means for said frame at the opposite side of the line of pivoting from said offset portion, a follower wheel for the pattern and a cutter for the work at the free end of said frame, a cutter shaft journaled on said offset portion and having a driving pulley at the opposite edge of the offset portion from the cutter, and means for driving said pulley from a source of power.

2. In a machine of the character described, the combination of a body having means for supporting and rotating a pattern and a work piece, a carriage substantially parallel to said body, a swinging frame mounted upon and extending transversely across a marginal portion of said carriage and having an offset portion adapted to lie in an opening of the carriage or swing out of the plane thereof, counter-balancing means for said frame at the opposite side of the line of pivoting from said offset portion, a follower wheel for the pattern and a cutter for the work on the offset portion of said frame, and means for driving said cutter.

3. In a machine of the character described, the combination of a body having means for supporting and rotating a pattern and a work piece, a carriage substantially parallel to said body, a swinging frame mounted in said carriage to swing out of the plane thereof, a follower wheel for the pattern and a cutter for the work at the free end of said frame, a motor on said swinging frame at the opposite side of its line of pivoting from said follower wheel and cutter, whereby it serves as a counterbalance, and means for driving said cutter from said motor.

4. In a machine of the character described, the combination of a body having means for supporting a pattern and a work piece, a carriage on said body, a swinging frame mounted in said carriage to swing out of the plane thereof, a follower wheel and a cutter on said frame, a motor on said frame having its shaft intersecting the line of pivoting of the frame, means substantially in said line of pivoting for transmitting motion from said shaft to the carriage, and other means for transmitting motion from said shaft to the cutter.

5. In a machine of the character described, the combination of a body having means for supporting a pattern and a work piece, a carriage on said body, a swinging frame mounted in said carriage to swing out of the plane thereof, a follower wheel and a cutter shaft on said frame, a motor on said frame having its shaft intersecting the line of pivoting of the frame and parallel to said cutter shaft, a belt substantially in said line of pivoting for driving the carriage from the motor shaft, and another belt from the motor shaft to the cutter shaft.

6. In a machine of the character described, the combination with a body portion having opposite uprights, of holders for the ends of a pattern and piece of work rotatably mounted in said uprights, angular cranks on the outer ends of said holders, a pair of connecting rods for each set of cranks connected to them at different angular points so that both the cranks cannot be over the dead center at the same time, and means for rotating one of said holders.

7. In a machine of the character described, the combination with a body portion having opposite uprights, of holders for the ends of a pattern and piece of work rotatably mounted in said uprights, cranks on the outer ends of said holders those for one upright being angularly spaced with respect to those on the other upright, a pair of connecting rods for each set of cranks connected to them at different angular points so that both the cranks cannot be over the dead center at the same time, and means for rotating one of said holders.

8. In a machine of the character described, the combination with a body portion having opposite uprights, of holders for the ends of a pattern and piece of work rotatably mounted in said uprights, cranks on the outer ends of said holders those for one upright being angularly opposite those on the other upright, a pair of connecting rods for each set of cranks connected to them at points 90° apart, and means for rotating one of said holders.

9. In a machine of the character described, the combination of a body having means for supporting a pattern and a work piece, a carriage on said body, a swinging frame mounted in said carriage to swing out of the plane thereof toward and away from the work, a follower wheel and a cutter on said frame, a motor on said frame at the opposite side of the line of pivoting thereof from said follower wheel and cutter, and means for driving said cutter from said motor.

10. In a machine of the character described, the combination of a body having means for supporting a pattern and a work piece, a carriage on said body having a central opening, a swinging frame mounted upon a marginal portion of said carriage at one side thereof and having an offset portion adapted to lie in the opening of the carriage, a follower wheel and a cutter on said offset portion, a motor on said swinging frame at the opposite side of the line of pivoting from said offset portion, and means for driving said cutter from said motor.

11. In a machine of the character described, the combination of a body having means for supporting a pattern and a work piece, a carriage on said body, a swinging frame mounted in said carriage to swing out of the plane thereof toward and away from the work, a follower wheel and a cutter on said frame, a motor located on said frame so that its weight aids in positioning the follower and cutter, and means for driving said cutter and carriage from said motor.

12. In a machine of the character described, the combination of a body having means for supporting a pattern and a work piece, a carriage on said body having a central opening, a swinging frame mounted upon a marginal portion of said carriage at one side thereof and having an offset portion adapted to lie in the opening of the carriage, a follower wheel and a cutter on said offset portion, a motor at the opposite side of the line of pivoting from said offset portion, and means for driving said cutter and carriage from said motor.

13. In a machine of the character described, the combination of a body having means for rotatably supporting a pattern and a work piece, a carriage on said body, a swinging frame mounted in said carriage to swing out of the plane thereof toward and away from the work, a follower wheel and a cutter on said frame, a motor located on said frame so that its weight aids in positioning the follower and cutter, and means for driving said cutter, carriage, pattern and work piece from said motor.

14. In a machine of the character described, the combination of a body having means for rotatably supporting a pattern and a work piece, a carriage on said body having a central opening, a swinging frame mounted upon a marginal portion of said carriage at one side thereof and having an offset portion adapted to lie in the opening of the carriage, a follower wheel and a cutter on said offset portion, a motor at the opposite side of the line of pivoting from said offset portion, and means for driving said cutter, carriage, pattern and work piece from said motor.

15. In a machine of the character described, the combination with a body portion, of holders for a pattern and a piece of work rotatably mounted in said body portion, cranks on said holders, a pair of connecting rods for said cranks connected to them at different angular points so that both the cranks cannot be over the dead center at the same time, and means for rotating one of said holders.

16. In a machine of the character described, the combination with a body portion, of holders for a pattern and a piece of work rotatably mounted in said body portion, angular cranks on said holders, a pair of connecting rods for said cranks connected to them at different angular points so that both the cranks cannot be over the dead center at the same time, and means for rotating one of said holders.

17. In a machine of the character described, the combination with a body portion, of holders for a pattern and a piece of work rotatably mounted in said body portion, cranks on said holders those for one holder being angularly opposite those for the other holder, a pair of connecting rods for said cranks connected to them at different angular points so that both the cranks cannot be over the dead center at the same time, and means for rotating one of said holders.

18. In a machine of the character described, the combination with a body portion, of holders for a pattern and a piece of work rotatably mounted in said body portion, cranks on said holders those for one holder being angularly opposite those for the other holder, a pair of connecting rods for said cranks connected to them at points 90° apart, and means for rotating one of said holders.

GEORGE W. DUCHEMIN.